United States Patent Office 3,136,790
Patented June 9, 1964

3,136,790
PROCESS OF PREPARATION OF STEROIDS HAVING A DOUBLE BOND IN THE 5,10-POSITION
Robert Joly, Montmorency, Seine-et-Oise, and Julien Warnant, Neuilly-sur-Seine, Seine, France, assignors to Roussel-UCLAF, S.A., Paris, France, a corporation of France
No Drawing. Filed Apr. 16, 1963, Ser. No. 273,296
Claims priority, application France Apr. 25, 1962
11 Claims. (Cl. 260—397.4)

The present invention relates to a novel process of preparation of steroids having a double bond in the 5(10)-position and particularly compounds of the general Formula II:

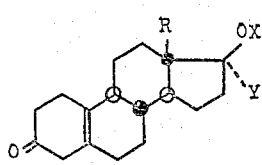

II in which R represents hydrogen or a lower alkyl radical and particularly a methyl, ethyl or n-propyl radical, X represents hydrogen or an acyl radical of an organic carboxylic acid having from 1 to 18 carbon atoms and Y represents hydrogen or an aliphatic radical containing from 1 to 2 carbon atoms and particularly methyl, ethyl or ethynyl. These carbon containing radicals can be unsubstituted hydrocarbon radicals or can be substituted.

It is known that in order to proceed to certain steroidal compounds of the class mentioned above, as for example, 17α - ethynyl - 19 - nor - $\Delta^{5(10)}$ - androstene - 17β - ol - 3-one, called also "norethynodrel" or "$\Delta^{5(10)}$-norethisterone," it has been necessary until today to reduce the A ring of an ether in the 3-position of estradiol into an ether of an enol, then to oxidize the alcohol in the 17-position into a ketone in order to proceed only then to ethynylation in the 17-position and to isomerization of the ether of the enol in the 3-position into a $\Delta^{5(10)}$-ketonic derivative (see particularly United States Patents 2,655,518 and 2,725,389). These steps are difficult, time-consuming and result in low yields of the desired product.

It is an object of the present invention to develop a process for the production of $\Delta^{5(10)}$-steriods from the corresponding $\Delta^{4,9}$-dienic steroids.

A further object of the invention is the development of a process for the production of a 5(10)-dehydro steroid of the formula

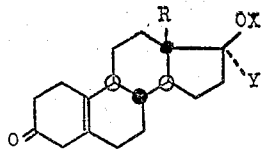

wherein R is selected from the group consisting of hydrogen and lower alkyl, X is selected from the group consisting of hydrogen and an acyl radical of an organic carboxylic acid having from 1 to 18 carbon atoms, and Y is selected from the group consisting of hydrogen, aliphatic hydrocarbon radicals having from 1 to 2 carbon atoms and substituted aliphatic hydrocarbon radicals having from 1 to 2 carbon atoms, which comprises the steps of subjecting a $\Delta^{4,9}$-dienic steroid compound of the formula

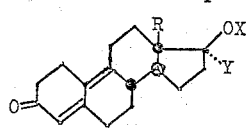

wherein R, X and Y have the above assigned values to the reducing action of a metal selected from the group consisting of alkali metals and calcium in the presence of liquid ammonia and a proton donor and recovering said 5(10)-dehydro steroid.

These and other objects of the invention will become more apparent as the description thereof proceeds.

It has now been found and it is on this unexpected discovery that the process, which is the object of the invention, is being based that certain steroid products having a $\Delta^{4,9}$-diene structure, such as those intermediates obtained in the course of total synthesis steroids and used in the elaboration of the aromatic A ring according to Velluz et al. (see, for example, Angewandte Chemie, No. 19/20, 1960, pages 725 to 730 and Tetrahedron Letters No. 3, pages 127 to 130, 1961), are particularly convenient in order to obtain directly a $\Delta^{5(10)}$-3-ketonic structure.

Following the process of the invention, $\Delta^{4,9}$-dienic steroids of the Formula I:

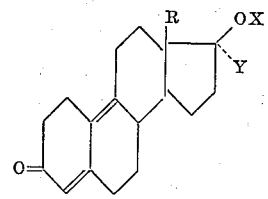

I wherein R is selected from the group consisting of hydrogen and lower alkyl, Y is selected from the group consisting of hydrogen, aliphatic hydrocarbon radicals having from 1 to 2 carbon atoms and substituted aliphatic hydrocarbon radicals having from 1 to 2 carbon atoms, and X is selected from the group consisting of hydrogen and an acyl radical of an organic carboxylic acid having from 1 to 18 carbon atoms, are subjected to a reduction with a metal selected from the group consisting of alkali metals and calcium in the presence of liquid ammonia and a proton donor. One of the important advantages of the present invention resides in the fact that in the case of the ethynylated compound (I, Y=C≡CH) the triple bond is not disturbed by the reduction according to the new process. This selectivity of reduction is totally unexpected.

It is thought, without wishing to be bound by the proposed theoretical considerations, that the reaction follows a mechanism of 1,6-reduction according to the partial flow diagram that follows hereafter:

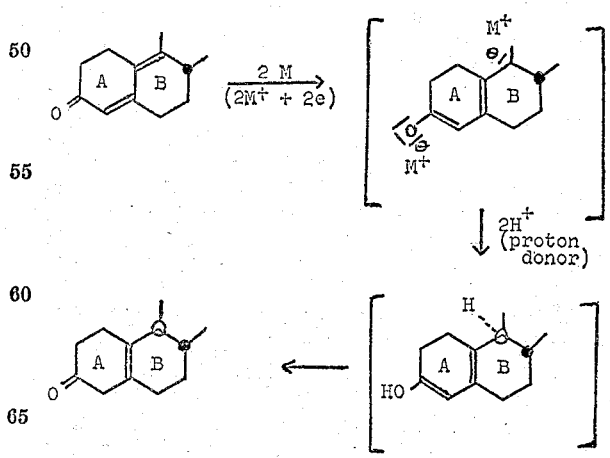

M represents the metal employed.

For the execution of the process of the invention varying ratios of metal to $\Delta^{4,9}$-dienic steroid may be employed; however, it is advantageous to utilize a slight excess of the metal with reference to the compound to be reduced. Advantageously, an amount which does not exceed 3 atoms of metal for each molecule of steroid is employed and preferentially between 2.1 and 2.5 atoms of metal per molecule of steroid are utilized.

While any metal selected from the group consisting of alkali metal and calcium can be utilized, it is particularly advantageous to choose lithium. As proton donors, lower aliphatic alcohols, particularly the lower alkanols, are very good. Preferentially, methanol or ethanol are utilized. These particular alcohols play, at the same time, the role of a solvent. The reaction can be conducted in the absence or in the presence of another solvent which should be inert with reference to the metals employed. This solvent can be chosen, preferentially from among the cyclic or aliphatic ethers. As examples, lower alkyl ethers such as ethyl or isopropyl ether, and cycloalkyl ethers such as dioxane or tetrahydrofuran can be employed, if desired, as a third inert solvent.

The reaction occurs at temperatures situated between about $-30°$ C. and about $-80°$ C., preferably between $-60°$ C. and $-70°$ C. The product is recovered by conventional procedures. It is preferable, however, to pour the reaction product in a mixture of water and ice, whereupon the reduced steroid separates.

It is evident that the reduction of $\Delta^{4,9}$-dienic compounds having an ester function in the 17-position following the process described, may cause hydrolysis of the ester function especially when an easily hydrolyzable ester is utilized, as in the case, for example, of the formiates. If desired, the compounds obtained are re-esterified by the action of a functional derivative of an organic carboxylic acid having from 1 to 18 carbon atoms.

The esters utilized as starting compounds as well as those prepared by esterifying the final compounds are those containing an acyl radical of an organic carboxylic acid having from 1 to 18 carbon atoms.

The acyl radicals or organic carboxylic acids having from 1 to 18 carbon atoms are those of aliphatic or cycloaliphatic, saturated or unsaturated carboxylic acids or those of aromatic or heterocyclic carboxylic acids: For example, alkanoic acids, such as formic acid, acetic acid, propionic acid, butyric acid, isobutyric acid, valeric acid, isovaleric acid, trimethylacetic acid, caproic acid, $\beta$-trimethylpropionic acid, oenanthic acid, caprylic acid, pelargonic acid, capric acid, undecylic acid, lauric acid, myristic acid, palmitic acid, stearic acid; alkenoic acids, such as undecylenic acid, oleic acid; cycloalkanoic acids, such as cyclopentyl-carboxylic acid, cyclopropyl-carboxylic acid, cyclobutyl-carboxylic acid, cyclohexyl-carboxylic acid; cycloalkylalkanoic acids, such as cyclopropylmethyl-carboxylic acid, cyclobutylmethyl-carboxylic acid, cyclopentylethyl-carboxylic acids, cyclohexylethyl-carboxylic acid; arylalkanoic acids, such as phenylacetic acid, phenylpropionic acid; benzoic acid; phenoxyalkanoic acids, such as phenoxyacetic acid, p-chlorophenoxyacetic acid, 2,4-dichlorophenoxyacetic acid, 4-t.-butylphenoxacetic acid, 3-phenoxypropionic acid, 4-phenoxybutyric acid; heterocyclic-carboxylic acids, such as furane-2-carboxylic acid, 5-t.-butyl-furane-2-carboxylic acid, 5-bromofurane-2-carboxylic acid, nicotinic acid; $\beta$-ketocarboxylic acids, such as acetylacetic acid, propionylacetic acid, butyrylacetic acid; aminoacids, such as diethylaminoacetic acid, aspartic acid; etc.

The following examples of reduction of $\Delta^{4,9}$-dienic steroids illustrate the invention without, however, limiting it. Among these examples, there is described the reduction of $17\alpha$-ethynyl-$13\beta$-n-propyl-$\Delta^{4,9}$-gonadiene-$17\beta$-ol-3-one to give $17\alpha$-ethynyl-$13\beta$-n-propyl-$\Delta^{5(10)}$-gonene-$17\beta$-ol-3-one. This latter compound, which is a new product, presents useful physiological properties and particularly a hypophysical inhibitory action. This compound together with its therapeutic properies is the subject matter of U.S. patent application Serial No. 273,295 filed April 16, 1963, filed concurrently herewith.

EXAMPLE I

*Reduction of 19-nor-$\Delta^{4,9}$-Androstadiene-$17\beta$-Ol-3-One*

3 gm. of 19-nor-$\Delta^{4,9}$-androstadiene-$17\beta$-ol-3-one were dissolved in 45 cc. of anhydrous tetrahydrofuran and 4.5 cc. of methanol. This solution was very slowly introduced into 42 cc. of liquid ammonia under an atmosphere of nitrogen at a temperature of $-70°$ C. Then, 0.225 gm. of lithium were added in the space of some ten minutes and the reaction mixture was agitated at the reaction temperature for a period of an hour and a half. The reaction mixture was then poured into a mixture of water and ice and under an atmosphere of nitrogen and allowed to stand for a period of thirty minutes. The 19-nor-$\Delta^{5(10)}$-androstene-$17\beta$-ol-3-one formed was then vacuum filtered, washed until the wash waters were neutral, and dried at $60°$ C. 2.985 gm. (being 98.8% of theoretical) of 19-nor-$\Delta^{5(10)}$-androstene-$17\beta$-ol-3-one were obtained. The product had a melting point of $198°$-$199°$ C. and had a specific rotation $[\alpha]_D^{20} = +179° \pm 2°$ (c.=1% in dioxane).

The product obtained is identical to the product described in the literature.

EXAMPLE II

*Reduction of $17\alpha$-Ethynyl-19-Nor-$\Delta^{4,9}$-Androstadiene-$17\beta$-Ol-3-One*

10 gm. of $17\alpha$-ethynyl-19-nor-$\Delta^{4,9}$-androstadiene-$17\beta$-ol-3-one were dissolved in a mixture of 50 cc. of methanol and 140 cc. of anhydrous tetrahydrofuran under an atmosphere of nitrogen. The yellow solution obtained was cooled to $-70°$. 140 cc. of liquid ammonia were added at $-70°$ C. Then, in a space of ten minutes, 600 mg. of finely pulverized lithium were introduced. The reaction mixture was agitated for a period of ten minutes while being maintained at $-70°$ C. Then the mixture was poured into a mixture of water and ice and agitated for a period of two hours. The product formed which constituted raw $17\alpha$-ethynyl-19-nor-$\Delta^{5(10)}$-androstene-$17\beta$-ol-3-one was recovered by vacuum filtration.

EXAMPLE III

*Reduction of $17\alpha$-Ethynyl-$13\beta$-n-Propyl-$\Delta^{4,9}$-Gonadiene-$17\beta$-Ol-3-One*

10 gm. of $17\alpha$-ethynyl-$13\beta$-n-propyl-$\Delta^{4,9}$-gonadiene-$17\beta$-ol-3-one were dissolved in a mixture of 50 cc. of methanol and 140 cc. of anhydrous tetrahydrofuran under an atmosphere of nitrogen. The solution obtained was cooled to $-70°$ C. 140 cc. of liquid ammonia were added. Then, over a space of ten minutes, about 535 mg. of finely pulverized lithium were introduced. The mixture was subjected to agitation under cooling towards $-70°$ C. for a period of about ten minutes. Next, the reaction mixture was poured into a mixture of water and ice. The mixture was agitated for a period of about two hours. The precipitate formed was vacuum filtered, washed with water until the wash waters were neutral, and dried. 9.657 gm. of raw $17\alpha$-ethynyl-$13\beta$-n-propyl-$\Delta^{5(10)}$-gonene-$17\beta$-ol-3-one were obtained. The product was purified by recrystallization from isopropyl ether. The purified product had a melting point $172°$ C. and a specific rotation $[\alpha]_D^{20} = +91°$ (c.=0.4% in methanol).

The product was soluble in alcohol, ether, acetone, benzene and chloroform and insoluble in water.

This compound is not described in the literature.

$17\alpha$-ethynyl-$13\beta$-n-propyl-$\Delta^{4,9}$-gonadiene-$17\beta$-ol-3-one, the starting compound, was prepared according to the method described in United States patent application Serial No. 204,057, filed June 21, 1962.

The previous examples are illustrative of the invention. It is to be understood, however, that other equivalent procedures and expedients known to those skilled in the art may be followed without departing from the spirit of the invention and the scope of the appended claims.

We claim:
1. A process for the production of a 5(10)-dehydro steroid of the formula

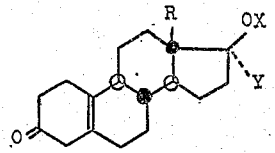

wherein R is selected from the group consisting of hydrogen and lower alkyl, X is a member selected from the group consisting of hydrogen and the acyl radical of an organic carboxylic acid having from 1 to 18 carbon atoms and Y is selected from the group consisting of hydrogen, and aliphatic hydrocarbon having from 1 to 2 carbon atoms which comprises the steps of subjecting a $\Delta^{4,9}$-dienic steroid compound of the formula

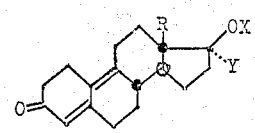

wherein R, X and Y have the above assigned values to the reducing action of a metal selected from the group consisting of alkali metals and calcium in the presence of liquid ammonia and a lower aliphatic alcohol as a proton donor and recovering said 5(10)-dehydro steroid.

2. The process of claim 1 wherein a slight excess of said metal with reference to said $\Delta^{4,9}$-dienic steroid compound is employed not exceeding 3 atoms of metal per molecule of steroid.

3. The process of claim 2 wherein said metal is employed in a ratio of between 2.1 and 2.5 atoms per molecule of steroid.

4. The process of claim 1 wherein said reducing action is conducted at a temperature between —80° C. and —30° C.

5. The process of claim 1 wherein said reducing action is conducted in the presence of a solvent inert to said metal.

6. The process of claim 1 wherein said metal is lithium.

7. A process for the production of a 5(10)-dehydro steroid of the formula

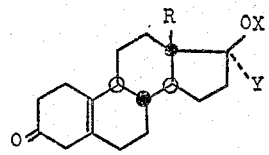

wherein R is selected from the group consisting of hydrogen and lower alkyl, X is selected from the group consisting of hydrogen and an acyl radical of an organic carboxylic acid having from 1 to 18 carbon atoms and Y is selected from the group consisting of hydrogen, and aliphatic hydrocarbon having from 1 to 2 carbon atoms which comprises the steps of subjecting a $\Delta^{4,9}$-dienic steroid compound of the formula

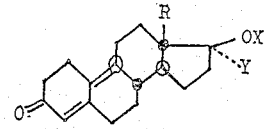

wherein R, X and Y have the above assigned values to the reducing action of a metal selected from the group consisting of alkali metals and calcium, said metal being present in a ratio of from about 2 to about 3 atoms per molecule of steroid, in the presence of liquid ammonia, and a lower alkanol as a proton donor at a temperature between —80° C. and —30° C. and recovering said 5(10)-dehydro steroid.

8. The process of claim 7 wherein said reducing action is conducted in the presence of a solvent inert to said metal selected from the group consisting of lower alkyl ethers and cycloalkyl ethers.

9. The process of producing 19-nor-$\Delta^{5(10)}$-androstene-17$\beta$-ol-3-one which comprises the steps of subjecting 19-nor-$\Delta^{4,9}$-androstadiene-17$\beta$-ol-3-one to the reducing action of lithium, said lithium being present in a ratio of from about 2.1 atoms to 2.5 atoms per molecule of 19-nor-$\Delta^{4,9}$-androstadiene-17$\beta$-ol-3-one, in the presence of liquid ammonia, a lower alkanol as proton donor and an inert solvent selected from the group consisting of lower alkyl ethers and cycloalkyl ethers at a temperature between —70° C. and —60° C. and recovering said 19-nor-$\Delta^{5(10)}$-androstene-17$\beta$-ol-3-one.

10. The process of producing 17$\alpha$-ethynyl-19-nor-$\Delta^{5(10)}$-androstene-17$\beta$-ol-3-one which comprises the steps of subjecting 17$\alpha$-ethynyl-19-nor-$\Delta^{4,9}$-androstadiene-17$\beta$-ol-3-one to the reducing action of lithium, said lithium being present in a ratio of from about 2.1 atoms to 2.5 atoms per molecule of 17$\alpha$-ethynyl-19-nor-$\Delta^{4,9}$-androstadiene-17$\beta$-ol-3-one, in the presence of liquid ammonia, a lower alkanol as proton donor and an inert solvent selected from the group consisting of lower alkyl ethers and cycloalkyl ethers at a temperature between —70° C. and —60° C. and recovering said 17$\alpha$-ethynyl-19-nor-$\Delta^{5(10)}$-androstene-17$\beta$-ol-3-one.

11. The process of producing 17$\alpha$-ethynyl-13$\beta$-n-propyl-$\Delta^{5(10)}$-gonene-17$\beta$-ol-3-one which comprises the steps of subjecting 17$\alpha$-ethynyl-13$\beta$-n-propyl-$\Delta^{4,9}$-gonadiene-17$\beta$-ol-3-one to the reducing action of lithium, said lithium being present in a ratio of from about 2.1 atoms to 2.5 atoms per molecule of 17$\alpha$-ethynyl-13$\beta$-n-propyl-$\Delta^{4,9}$-gonadiene-17$\beta$-ol-3-one, in the presence of liquid ammonia, a lower alkanol as proton donor and an inert solvent selected from the group consisting of lower alkyl ethers and cycloalkyl ethers at a temperature between —70° C. and —60° C. and recovering said 17$\alpha$-ethynyl-13$\beta$-n-propyl-$\Delta^{5(10)}$-gonene-17$\beta$-ol-3-one.

No references cited.